(12) United States Patent
Edge et al.

(10) Patent No.: US 9,743,228 B2
(45) Date of Patent: Aug. 22, 2017

(54) TRANSPORT OF LCS-RELATED MESSAGES FOR LTE ACCESS

(75) Inventors: Stephen W. Edge, Escondido, CA (US); Kirk Allan Burroughs, Alamo, CA (US); Ramachandran Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 12/819,815

(22) Filed: Jun. 21, 2010

(65) Prior Publication Data
US 2011/0143771 A1   Jun. 16, 2011

Related U.S. Application Data

(60) Provisional application No. 61/219,376, filed on Jun. 22, 2009, provisional application No. 61/236,501, filed on Aug. 24, 2009.

(51) Int. Cl.
*H04W 24/00* (2009.01)
*H04W 4/00* (2009.01)
(Continued)

(52) U.S. Cl.
CPC .............. *H04W 4/02* (2013.01); *H04L 67/14* (2013.01); *H04L 67/18* (2013.01); *H04W 4/20* (2013.01)

(58) Field of Classification Search
CPC ....... H04W 64/00; H04W 4/02; H04W 24/00; H04M 11/04
(Continued)

(56) References Cited

U.S. PATENT DOCUMENTS 5,958,452 A   9/1999  Oshlack et al.
8,660,574 B2  2/2014  Edge
(Continued)

FOREIGN PATENT DOCUMENTS

EP   1986456 A2   10/2008
JP   2012517651 A  8/2012
(Continued)

OTHER PUBLICATIONS

3rd Generation Partnership Project; Technical Specification Group Core Network and Terminals; Non-Access-Stratum (NAS) protocol for Evolved Packet System (EPS); Stage 3 (Release 8) 3GPP Standard; 3GPP TS 24.301, 3rd Generation Partnership Project (3GPP), Mobile Competence Centre; 650, Route Des Lucioles ; F-06921 Sophia-Antipolis Cedex; France, No. V8.1.0, Mar. 1, 2009 (Mar. 1, 2009), pp. 1-250, XP050365238 p. 117.
(Continued)

*Primary Examiner* — Kent Chang
*Assistant Examiner* — William Lu

(57) ABSTRACT

Techniques for transporting messages for location services (LCS) are described. A Mobility Management Entity (MME) may have a location session with an Evolved Serving Mobile Location Center (E-SMLC) to provide location services for a User Equipment (UE). The UE may exchange LCS-related messages with the E-SMLC to obtain location services. In an aspect, LCS-related messages exchanged between the UE and the E-SMLC may be encapsulated in Non-Access Stratum (NAS) messages and transported via the MME and a base station. In another aspect, a routing identifier (ID) may be used to associate messages exchanged between the UE and the MME with the location session between the MME and the E-SMLC for the UE. Each NAS message exchanged between the MME and the UE may include the routing ID, which may enable the MME
(Continued)

to associate each NAS message from the UE with the location session between the MME and the E-SMLC.

34 Claims, 7 Drawing Sheets

(51) Int. Cl.
*H04W 40/00* (2009.01)
*H04M 11/04* (2006.01)
*H04W 4/02* (2009.01)
*H04W 4/20* (2009.01)
*H04L 29/08* (2006.01)

(58) Field of Classification Search
USPC .......... 455/456.1–6, 567; 370/352, 331, 328, 370/254, 338
See application file for complete search history.

(56) References Cited

U.S. PATENT DOCUMENTS

| | | | | |
|---|---|---|---|---|
| 8,718,043 | B2* | 5/2014 | Chin ................. | H04W 36/0022 370/352 |
| 2002/0010127 | A1 | 1/2002 | Oshlack et al. | |
| 2003/0139183 | A1* | 7/2003 | Rantalainen .......... | H04W 36/32 455/435.1 |
| 2006/0276167 | A1* | 12/2006 | Burroughs ............ | G01S 5/0027 455/404.2 |
| 2006/0293066 | A1* | 12/2006 | Edge et al. ................ | 455/456.3 |
| 2007/0004429 | A1* | 1/2007 | Edge et al. ................ | 455/456.1 |
| 2008/0076386 | A1* | 3/2008 | Khetawat ................ | H04M 3/16 455/410 |
| 2009/0129342 | A1* | 5/2009 | Hwang ............. | H04W 36/0022 370/331 |
| 2009/0156208 | A1* | 6/2009 | Vesterinen et al. ........ | 455/435.1 |
| 2009/0156213 | A1* | 6/2009 | Spinelli ................ | H04W 36/36 455/436 |
| 2009/0268635 | A1* | 10/2009 | Gallagher et al. ............ | 370/254 |
| 2009/0270097 | A1 | 10/2009 | Gallagher et al. | |
| 2010/0041418 | A1 | 2/2010 | Edge et al. | |
| 2010/0075670 | A1* | 3/2010 | Wu ................................ | 455/434 |

FOREIGN PATENT DOCUMENTS

| | | |
|---|---|---|
| RU | 2007131690 A | 2/2009 |
| RU | 2446600 C2 | 3/2012 |
| WO | WO-03004009 A1 | 1/2003 |
| WO | WO-2006078990 A2 | 7/2006 |
| WO | WO2006111822 A2 | 10/2006 |
| WO | WO-2008088258 A1 | 7/2008 |

OTHER PUBLICATIONS

3rd Generation Partnership Project; Technical Specification Group Services and System Aspects; Evaluation of LCS Control Plane Solutions for EPS (Release 9) 3GPP Standard; 3GPP TR 23.891, 3rd Generation Partnership Project (3GPP), Mobile Competence Centre; 650, Route Des Lucioles; F-06921 Sophia-Antipolis Cedex; France, No. V. 1.0.0, Mar. 1, 2009 (Mar. 1, 2009), pp. 1-64, XP050364141.

International Search Report and Written Opinion—PCT/US2010/039478, International Search Authority -European Patent Office—Apr. 5, 2011.

3rd Generation Partnership Project, Technical Specification Group Services and System Aspects, Functional stage 2 description of Location Services (LCS) (Release 9), 3GPP Standard, 3GPP TS 23.271, 3rd Generation Partnership Project (3GPP), Mobile Competence Centre, 650, Route Des Lucioles, F-06921 Sophia-Antipolis Cedex, France, No. V9.0.0, Jun. 1, 2009 (Jun. 1, 2009), pp. 1-164, XP050363508.

NTT Docomo et al., "Clarification on Session Identifier and LPP, LPPa routing mechanism", 3GPP Draft; R2-096528 LPP Routing and Transport, 3rd Generation Partnership Project (3GPP), Mobile Competence Centre, 650, Route Des Lucioles, F-06921 Sophia-Antipolis Cedex, France, No. Jeju, 20091109, Nov. 9, 2009 (Nov. 9, 2009), XP050391108, [retrieved on Nov. 2, 2009]

QUALCOMM Europe et al., 3GPP, vol. SA WG2, No. Miami, 20081117, Nov. 21, 2008 (Nov. 21, 2008), XP050458170, [retrieved on Nov. 21, 2008].

3rd Generation Partnership Project; Technical Specification Group Core Network and Terminals; Non-Access-Stratum (NAS) protocol for Evolved Packet System (EPS); Stage 3, (Release 8), 3GPP Standard; 3GPP TS 24.301, 3rd Generation Partnership Project (3GPP), Mobile Competence Centre; 650, Route Des Lucioles ; F06921 Sophia-Antipolis Cedex; France, No. V8.2.0, Jun. 8, 2009 (Jun. 8, 2009), pp. 1-251.

3rd Generation Partnership Project; Technical Specification Group Services and System Aspects; Evaluation of LCS Control Plane Solutions for EPS (Release 9) 3GPP Standard; 3GPP TR 23.891, 3rd Generation Partnership Project (3GPP), Mobile Competence Centre; 650, Route Des Lucioles; F-06921 Sophia-Antipolis Cedex; France, No. V. 9.0.0, Mar. 17, 2009 (Mar. 17, 2009), pp. 1-64.

European Search Report—EP12187601—Search Authority—Munich—Nov. 28, 2012.

Huawei: "Clarification on the usage of Session ID", 3GPP Draft; R2-096512, 3rd Generation Partnership Project (3GPP), Mobile Competence Centre ; 650, Route Des Lucioles; F-06921 Sophia-Antipolis Cedex ; France, No. Jeju; 20091109, Nov. 9, 2009 (Nov. 9, 2009), XP050391099, [retrieved on Nov. 9, 2009].

Taiwan Search Report—TW099120284—TIPO—May 20, 2013.

QUALCOMM Europe, "Miscellaneous Corrections for EPC LCS Control Plane Solution," 3GPP TSG-SA WG2 Meeting #75,Aug. 22, 2009, S2-095213, pp. 1-8, URL,http://www.3gpp.org/FTP/tsg_sa/WG2_Arch/TSGS2_75_Kyoto/Docs/S2-095213.zip, pp. 1-6.

QUALCOMM Europe, "Miscellaneous Corrections for EPC LCS Control Plane Solution," 3GPP TSG-SA WG2 Meeting #75,Sep. 4, 2009,S2-096076 URL,http://www.3gpp.org/FTP/tsg_sa/WG2_Arch/TSGS2_75_Kyoto/Docs/S2-096076.zip, pp. 1-6.

QUALCOMM Europe, "Updates to LPPa material in stage 2," 3GPP TSG-RAN WG3 Meeting #66 , Nov. 19,2009 ,R3-093021 URL,http://www.3gpp.org/ftp/tsg_ran/WG3_lu/TSGR3_66/docs/R3-093071.zip, pp. 1-44.

3GPP TS 23.271: 3rd Generation Partnership Project; Technical Specification Group Services and System Aspects; Functional stage 2 description of Location Services (LCS)(Release 9), 3GPP TS 23.271 V9.4.0 (Jun. 2010), Jun. 10, 2010, pp. 123-124.

* cited by examiner

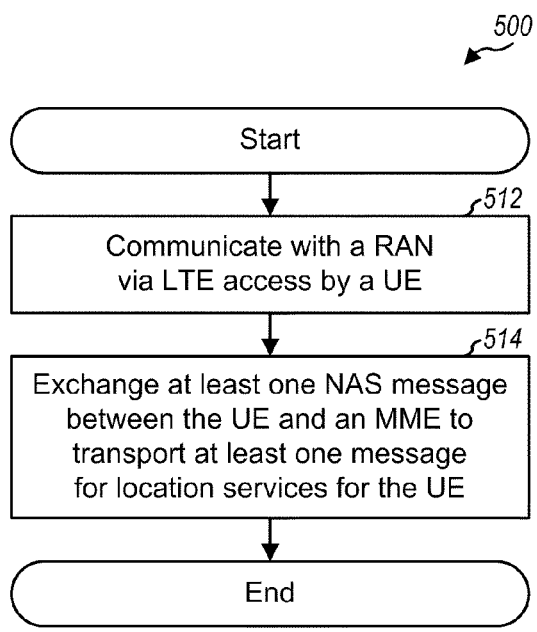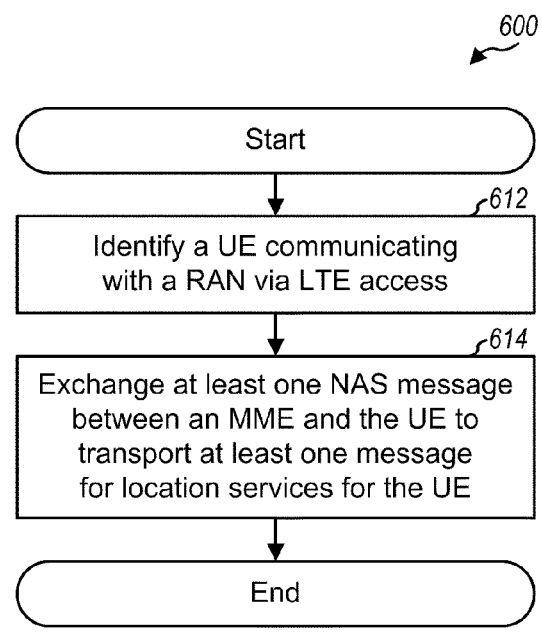
FIG. 5
FIG. 6

TRANSPORT OF LCS-RELATED MESSAGES FOR LTE ACCESS

CLAIM OF PRIORITY UNDER 35 U.S.C. §119

The present Application for patent claims priority to Provisional U.S. Application Ser. No. 61/219,376, entitled "LCS Architecture for LTE," filed Jun. 22, 2009, and Provisional U.S. Application Ser. No. 61/236,501, entitled "Transport of LCS Related Messages for LTE Access," filed Aug. 24, 2009, both assigned to the assignee hereof and expressly incorporated herein by reference.

BACKGROUND

I. Field

The present disclosure relates generally to communication, and more specifically to techniques for supporting location services (LCS) in a wireless network.

II. Background

It is often desirable, and sometimes necessary, to know the location of a User Equipment (UE), e.g., a cellular phone. The terms "location" and "position" are synonymous and are used interchangeably herein. For example, an LCS client may desire to know the location of the UE and may communicate with a location center in order to request for the location of the terminal. The location center and the UE may then exchange messages, as necessary, to obtain a location estimate for the UE. The location center may then return the location estimate to the LCS client.

The location center and the UE may exchange messages for location services via one or more network entities. It may be desirable to efficiently route messages for location services.

SUMMARY

Techniques for transporting messages for location services (or LCS-related messages) are described herein. A Mobility Management Entity (MME) may have a location session with a location center (e.g., an Evolved Serving Mobile Location Center (E-SMLC)) to provide location services for a UE. The UE may exchange LCS-related messages with the E-SMLC to obtain location services. The LCS-related messages may be forwarded via other network entities such as the MME and a base station.

In an aspect, LCS-related messages exchanged between the UE and the E-SMLC may be encapsulated in Non-Access Stratum (NAS) messages and transported via the base station and the MME. The use of NAS messages to transport LCS-related messages may simplify operation of the base station, the MME, and the UE.

In another aspect, a routing identifier (ID) may be used to associate messages exchanged between the UE and the MME with the location session between the MME and the E-SMLC for the UE. The MME may include the routing ID in each NAS message sent to the UE to support location services for the UE. The UE may include the same routing ID in each NAS message sent to the MME to obtain location services. The MME may be able to associate each NAS message received from the UE with the location session between the MME and the E-SMLC based on the routing ID included in the NAS message by the UE. The use of the routing ID may be beneficial for various reasons, especially since the MME may not maintain state information for messages exchanged between the MME and the UE.

Various aspects and features of the disclosure are described in further detail below.

BRIEF DESCRIPTION OF THE DRAWINGS

FIGS. 5 and 6 show processes performed by a UE and an MME, respectively, for exchanging NAS messages for location services.

DETAILED DESCRIPTION

The techniques described herein for transporting LCS-related messages may be used for various wireless networks and radio technologies, including those defined by organizations named "3rd Generation Partnership Project" (3GPP) and "3rd Generation Partnership Project 2" (3GPP2). For example, the techniques may be used for a Long Term Evolution (LTE) network implementing Evolved Universal Terrestrial Radio Access (E-UTRA) defined by 3GPP. LTE is part of 3GPP Evolved Packet System (EPS). LTE, E-UTRA and EPS are described in documents from 3GPP. The techniques may also be used for other wireless networks and other radio technologies.

The techniques described herein may also be used for various control plane location solutions or architectures that can support location services. Location services refer to any services based on or related to location information. Location information may include any information related to the location of a UE, e.g., a location estimate, measurements, etc. Location services may include positioning, which refers to a functionality that determines a geographical location of a target UE. In a control plane location solution, messages supporting location services may be carried as part of signaling transferred between various network entities, typically with network-specific protocols, interfaces, and signaling messages. Some control plane location solutions include (i) 3GPP TS 23.271, TS 43.059, TS 25.305, and TS 36.305 from 3GPP and (ii) IS-881 and X.S0002 from 3GPP2.

The techniques described herein may also be used for various positioning protocols such as (i) LTE Positioning Protocol (LPP), Radio Resource LCS Protocol (RRLP), and Radio Resource Control (RRC) defined by 3GPP and (ii) C.S0022 (also known as IS-801) defined by 3GPP2. A positioning protocol may be used to coordinate and control positioning of UEs. A positioning protocol may define (i) procedures that may be executed by a location center and a UE being positioned and (ii) communication or signaling between the UE and the location center.

For clarity, various aspects of the techniques are described below for supporting location services in an LTE network utilizing a control plane location solution and LPP. Also for clarity, LTE terminology is used in much of the description below.

Figure 1:
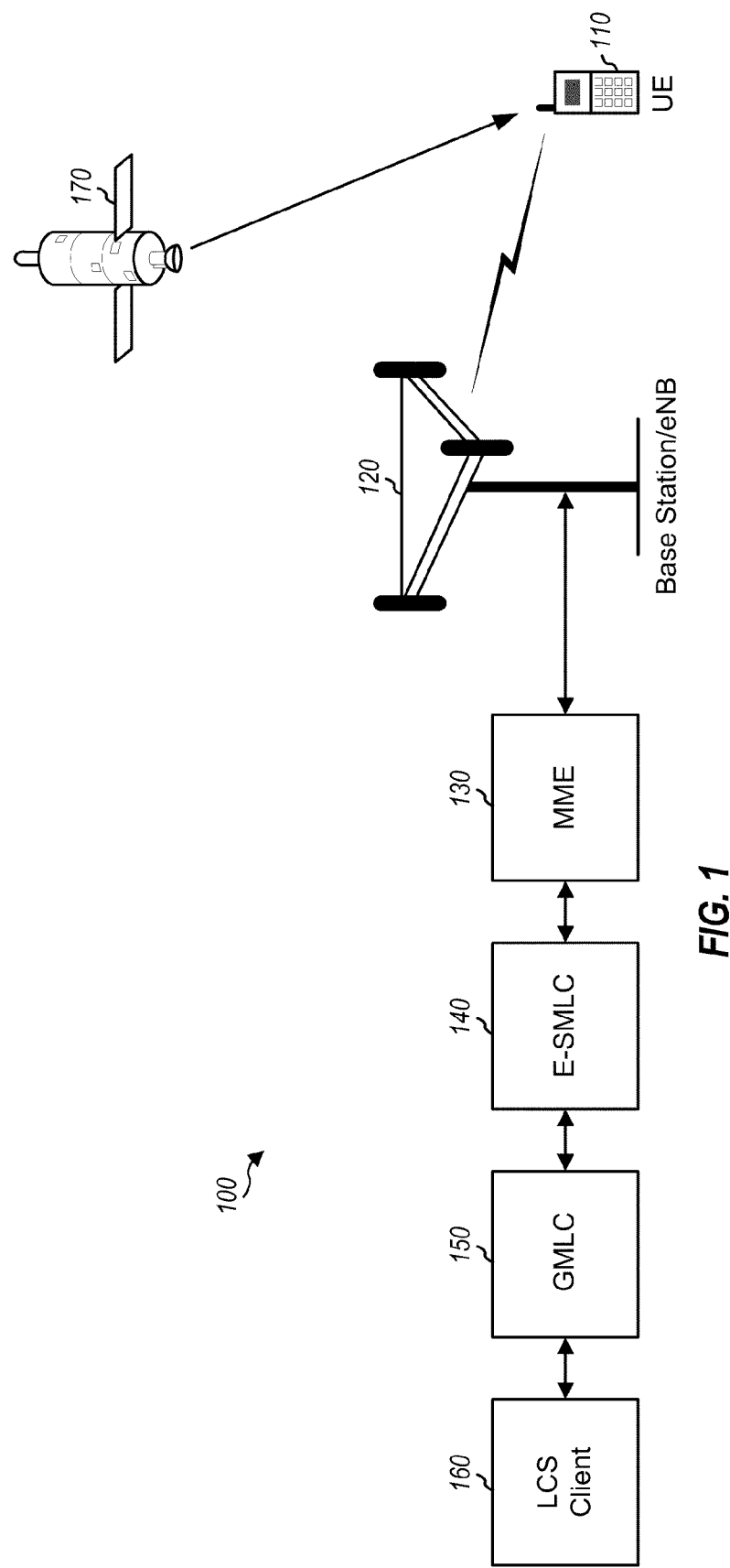
FIG. 1 shows a block diagram of a wireless network.

FIG. 1 shows a block diagram of a wireless network 100, which may be an LTE network or some other wireless network. A UE 110 may communicate with an eNB 120 in a Radio Access Network (RAN) to obtain communication services. The RAN may include other network entities not shown in FIG. 1 for simplicity and may also be referred to as an Evolved Universal Terrestrial Radio Access Network (E-UTRAN). eNB 120 may also be referred to as a base station, a Node B, an access point, etc. UE 110 may also be referred to as a mobile station, a terminal, an access terminal, a subscriber unit, a station, etc. UE 110 may be a cellular phone, a personal digital assistant (PDA), a wireless device, a wireless modem, a wireless router, a laptop computer, a telemetry device, a tracking device, etc.

UE 110 may also receive and measure signals from one or more satellites 170 and may obtain pseudo-range measurements for the satellites. Satellites 170 may be part of a satellite positioning system (SPS), which may be the United States Global Positioning System (GPS), the European Galileo system, the Russian GLONASS system, or some other SPS. UE 110 may also measure signals from eNBs and obtain timing measurements, signal strength measurements, signal quality measurements, and/or identification information for the eNBs. The measurements and/or identification information may be used to derive a location estimate for UE 110. A location estimate may also be referred to as a position estimate, a position fix, etc.

eNB 120 may communicate with an MME 130, which may perform various control functions such as mobility management, gateway selection, authentication, bearer management, etc. MME 130 may communicate with an E-SMLC 140 and other network entities not shown in FIG. 1 for simplicity. E-SMLC 140 may support UE-based, UE-assisted, network-based, and/or network-assisted positioning methods and may support one or more MMEs. E-SMLC 140 may perform various functions to support location services such as (i) computing a location estimate for UE 110 from measurements provided by UE 110 and/or eNB 120 and (ii) providing assistance data to UE 110. E-SMLC 140 may also be referred to as a location center, a location server, a positioning center, a standalone SMLC (SAS), a Position Determination Entity (PDE), etc. A Gateway Mobile Location Center (GMLC) 150 may support location services, interface with external LCS clients (e.g., an LCS client 160), and provide services such as subscriber privacy, authorization, authentication, billing, etc.

LCS client 160 may be an entity that desires location information for UE 110 and may communicate with GMLC 150 to obtain the location information. LCS client 160 may be external to UE 110, as shown in FIG. 1. UE 110 may also have an LCS client that is resident within the UE (not shown in FIG. 1).

FIG. 1 shows some network entities that can support location services in wireless network 100. Wireless network 100 may include different and/or additional network entities to support location services. Wireless network 100 may also include other network entities that can provide other services and support other functions.

Figure 2:
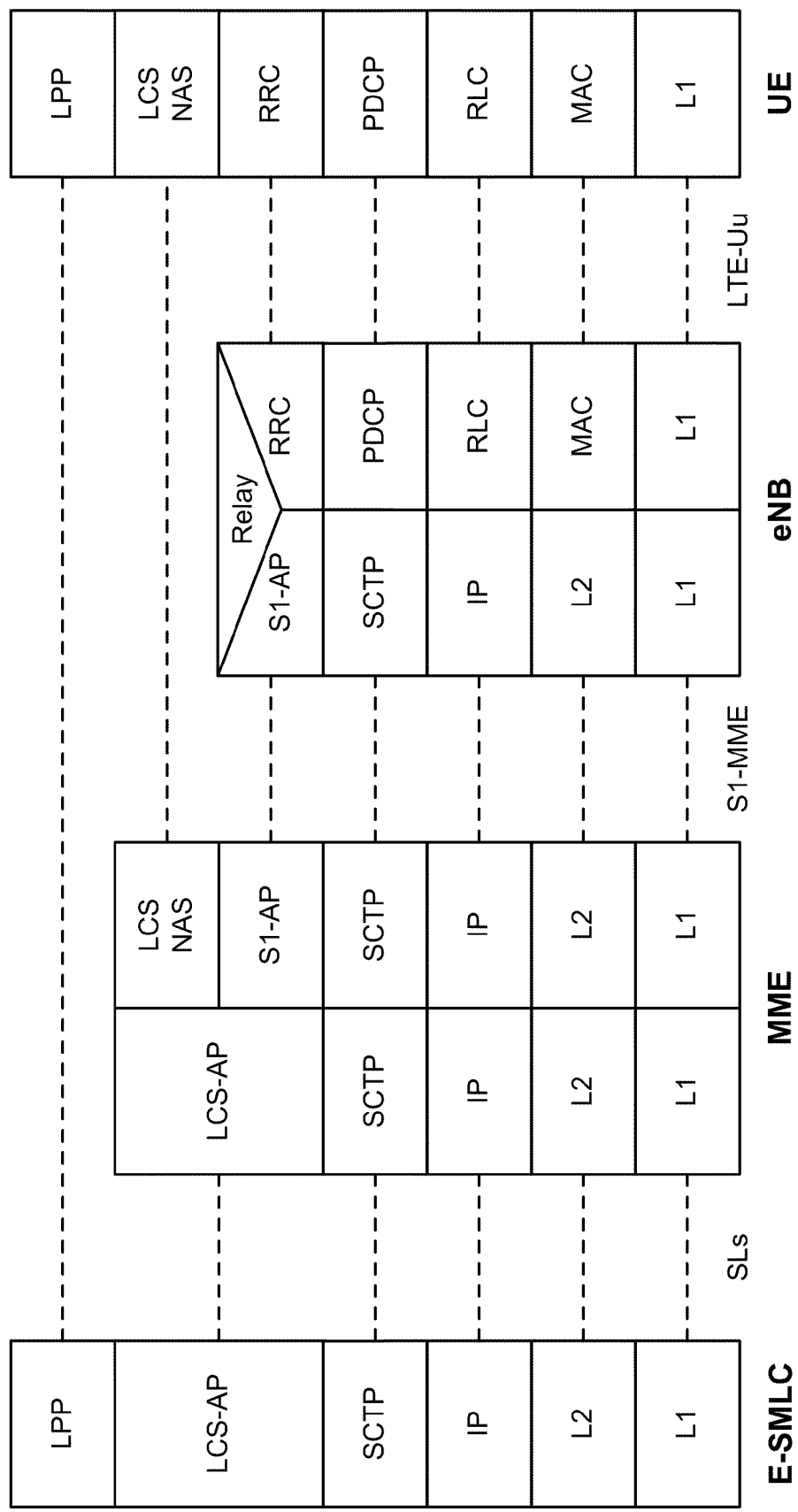
FIG. 2 shows exemplary protocol stacks at various entities in the wireless network.

FIG. 2 shows exemplary protocol stacks at UE 110, eNB 120, MME 130 and E-SMLC 140 for communication between UE 110 and E-SMLC 140 for location services. UE 110 may communicate with E-SMLC 140 using LPP. At UE 110, LPP may operate over NAS, Radio Resource Control (RRC), Packet Data Convergence Protocol (PDCP), Radio Link Control (RLC), Medium Access Control (MAC), and E-UTRA air-link. eNB 120 may communicate with UE 110 via RRC, PDCP, RLC, MAC and E-UTRA air-link. eNB 120 may also communicate with MME 130 via S1 Application Protocol (S1-AP), Stream Control Transmission Protocol (SCTP), Internet Protocol (IP), and suitable Layer 2 (L2) and Layer 1 (L1) protocols. MME 130 may communicate with E-SMLC 140 via LCS Application Protocol (LCS-AP), SCTP, IP, L2 and L1.

For LTE, MAC is described in 3GPP TS 36.321, RLC is described in 3GPP TS 36.322, PDCP is described in 3GPP TS 36.323, RRC is described in 3GPP TS 36.331, and S1-AP is described in 3GPP TS 36.413. SCTP is described in RFC 2960, and IP is described in RFCs 791 and 2460. The 3GPP TS documents are publicly available from 3GPP. The RFC documents are publicly available from The Internet Engineering Task Force (IETF).

UE 110 may exchange (e.g., send and/or receive) LPP messages with E-SMLC 140 for location services. It may be desirable to transport the LPP messages between UE 110 and E-SMLC 140 via network entities such as eNB 120 and MME 130 as efficiently as possible, e.g., to reduce impact to these network entities.

In an aspect, messages for location services (e.g., LPP messages) exchanged between UE 110 and E-SMLC 140 may be encapsulated in NAS messages and transported via network entities such as eNB 120 and MME 130. NAS messages may be used to transport EPS mobility management (EMM) messages and EPS session management (ESM) messages exchanged between MME 130 and UE 110. The functionality of NAS may be extended to support transport of LCS-related messages.

As shown in FIG. 2, LCS-related messages (e.g., LPP messages) may be exchanged between UE 110 and E-SMLC 140. The LCS-related messages may be encapsulated in NAS messages for transport between UE 110 and MME 130. The NAS messages may be further encapsulated in RRC messages for transport between UE 110 and eNB 120 using the protocols shown for these entities in FIG. 2. The NAS messages may also be encapsulated in S1-AP NAS transport messages (which are messages for S1-AP) for transport between eNB 120 and MME 130 using the protocols shown for these entities in FIG. 2. The LCS-related messages may be encapsulated in LCS-AP messages for transport between MME 130 and E-SMLC 140 using the protocols shown for these entities in FIG. 2.

Transport of LCS-related messages (e.g., LPP messages) inside NAS messages between UE 110 and MME 130 may be more efficient than using some alternative protocol, e.g., may require less implementation, less testing, and/or less signaling. NAS is used between MME 130 and UE 110 to transport messages related to mobility management and session management. Extending NAS to transport LCS-related messages would reuse an existing protocol and may not require definition, implementation, and testing of a new protocol. Furthermore, transporting LCS-related messages inside NAS messages may not add additional impacts to eNB 120 (beyond current impacts to eNB 120 to transport EMM and ESM messages).

Figure 3:
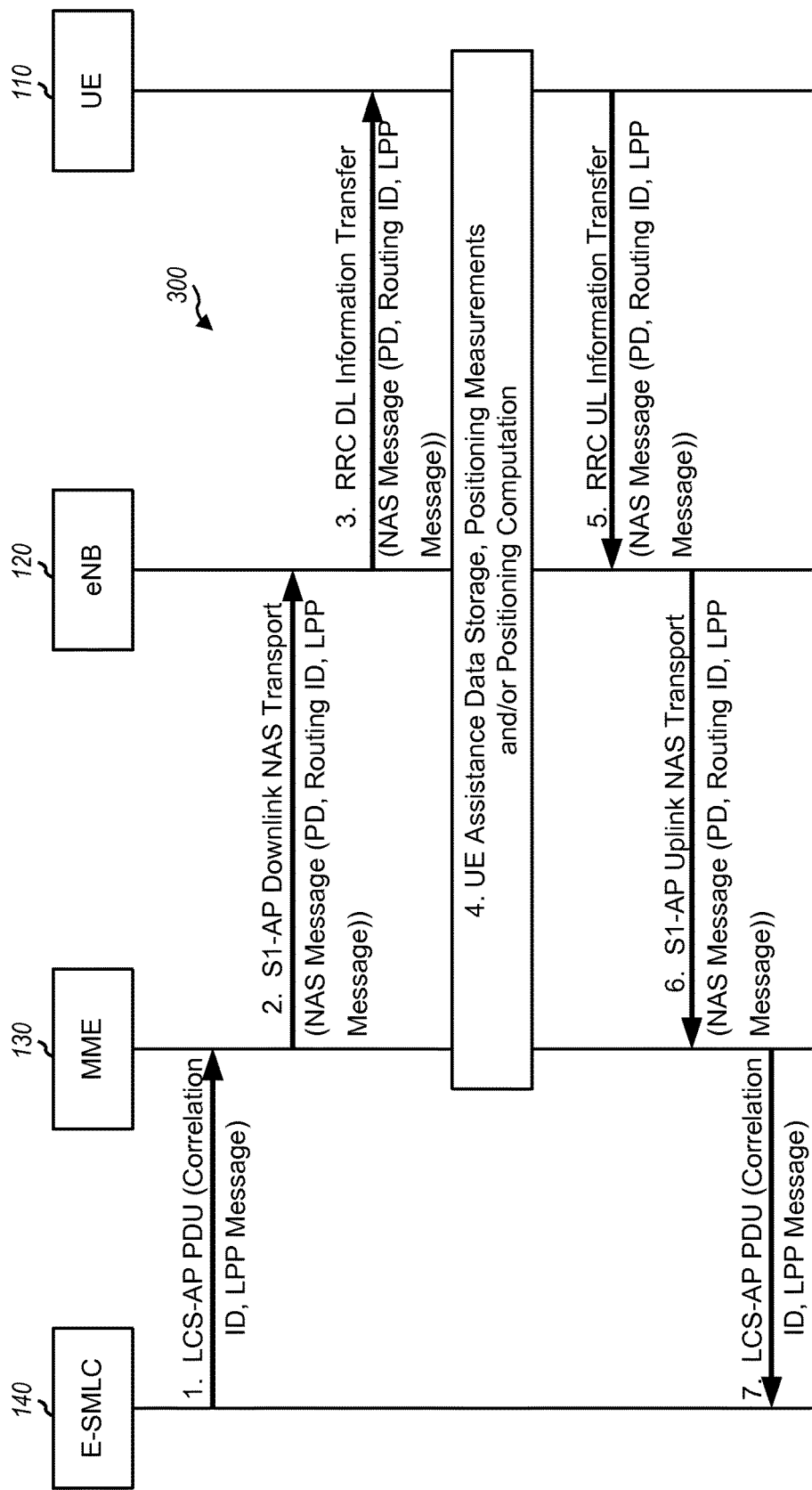
FIG. 3 shows a call flow to provide location services for a UE.

FIG. 3 shows a design of a call flow 300 to provide location services for UE 110. Call flow 300 may be part of a Mobile Originated Location Request (MO-LR) procedure that may be initiated by UE 110 to request for location services. Call flow 300 may also be part of a Mobile Terminated Location Request (MT-LR) procedure that may be initiated by a network entity (e.g., GMLC 150) to provide location services for UE 110, e.g., in response to a location request from LCS client 160. Call flow 300 may also be part of a Network Induced Location Request (NI-LR) procedure that may be initiated by MME 130 to provide location services for internal network reasons, e.g., to support an emergency call from UE 110. Call flow 300 may be used to support UE-based positioning, UE-assisted positioning, delivery of assistance data to UE 110, etc.

MME 130 may have a location session with E-SMLC 140 to provide location services for UE 110 and may maintain state information for this location session. MME 130 may assign a correlation ID that may be used to identify messages exchanged between MME 130 and E-SMLC 140 for the location session. E-SMLC 140 and UE 110 may exchange LCS-related messages via MME 130 during the location session to provide location services for UE 110. However, MME 130 may not store any state information for communication with UE 110.

In an aspect, MME 130 may assign a routing ID that may be used to associate messages exchanged between MME 130 and UE 110 with the location session between MME 130 and E-SMLC 140. The routing ID may also be referred to as a session ID, etc. The routing ID may be used to identify messages exchanged between MME 130 and UE 110 whereas the correlation ID may be used to identify messages exchanged between MME 130 and E-SMLC 140 for location services for UE 110. The correlation ID and the routing ID may both be for a location procedure (e.g., MO-LR, MT-LR, or NI-LR) for UE 110 and may be associated with one another. For example, the routing ID may be the same as the correlation ID, or may include all or part of the correlation ID as part of the routing ID. Alternatively, the routing ID may have no relationship to the value of the correlation ID but may be associated with the correlation ID using indexing (e.g., the correlation ID or routing ID may be used as an index into a table that may provide the value of the other ID) or other forms of data mapping (e.g., hash table, memory address pointer, etc.). MME 130 may maintain this association/correspondence between the routing ID and the correlation ID for UE 110.

E-SMLC 140 may need to provide location services to UE 110 and/or to obtain the location of UE 110. E-SMLC 140 may determine the correlation ID for the location session between E-SMLC 140 and MME 130. The correlation ID may be assigned by MME 130 via an earlier transaction not shown in FIG. 3 (e.g., may be assigned by MME 130 when a location session for UE 110 is first initiated by MME 130 with E-SMLC 140). The main purpose of the location session may be to provide location services for UE 110. Hence, the correlation ID for the location session may be associated with UE 110. E-SMLC 140 may send an LCS-AP protocol data unit (PDU) carrying the correlation ID and one or more LPP messages to MME 130 (step 1). The LPP message(s) may request for location information from UE 110, provide assistance data to UE 110, query for the capabilities of UE 110, etc.

MME 130 may receive the LCS-AP PDU from E-SMLC 140 and may extract the correlation ID and the LPP message (s) from the LCS-AP PDU. MME 130 may generate a NAS message comprising a protocol discriminator (PD), the routing ID, and the LPP message(s) received from E-SMLC 140. The PD may be used to indicate that the NAS message is transporting LCS-related messages instead of EMM messages or ESM messages. NAS messages typically include distinct PD values for EMM and ESM messages, as defined in 3GPP TS 24.301 and TS 24.007. However, the PD value used for NAS messages that carry LCS-related messages may differ from the PD values used to carry EMM and ESM messages, thereby indicating to a receiver (e.g., UE 110 or eNB 120) that an LCS-related message is being transported. The LCS-related messages may also be differentiated from the EMM messages and ESM messages in other manners. MME 130 may send an S1-AP NAS Transport message carrying the NAS message to eNB 120 (step 2). eNB 120 may receive the S1-AP NAS Transport message from MME 130 and may extract the NAS message. eNB 120 may then send an RRC Downlink (DL) Information Transfer message carrying the NAS message to UE 110 (step 3).

UE 110 may receive the RRC Downlink Information Transfer message from eNB 120 and may extract the NAS message. UE 110 may further extract the PD, the routing ID, and the LPP message(s) from the NAS message. UE 110 may store any assistance data provided in the LPP message (s) and may perform any positioning measurements and/or location computation requested by the LPP message(s) (step 4).

UE 110 may generate one or more LPP messages, which may include any location information obtained in step 4, any UE capabilities requested by E-SMLC 140, a request for further assistance data, and/or other information. UE 110 may generate a NAS message comprising the PD, the routing ID received in step 3, and the LPP message(s) generated by UE 110. The PD may be used by MME 130 to differentiate between LCS-related messages, EMM messages, and ESM messages. The routing ID may be used by MME 130 to associate the NAS message from UE 110 with the location session between MME 130 and E-SMLC 140 for UE 110. UE 110 may send an RRC Uplink (UL) Information Transfer message carrying the NAS message to eNB 120 (step 5).

eNB 120 may receive the RRC Uplink Information Transfer message from UE 110, extract the NAS message, and generate an S1-AP NAS Transport message comprising the NAS message. eNB 120 may then send the S1-AP NAS Transport message to MME 130 (step 6). MME 130 may receive the S1-AP NAS Transport message from eNB 120 and extract the NAS message. MME 130 may further extract the PD, the routing ID, and the LPP message(s) from the NAS message. MME 130 may determine that the LPP message(s) is associated with the location session between MME 130 and E-SMLC 140 based on the routing ID. MME 130 may then generate an LCS-AP PDU comprising the correlation ID associated with the routing ID as well as the LPP message(s) obtained from the NAS message received from eNB 120. MME 130 may send the LCS-AP PDU to E-SMLC 140 (step 7). Steps 5 to 7 may be repeated if UE 110 needs to send multiple LPP messages to respond to the request received in step 3. Steps 1 to 7 may be repeated to send new assistance data, to request further location information, to request further UE capabilities, etc.

As shown in FIG. 3, the routing ID may allow MME 130 to associate LCS-related messages exchanged between MME 130 and UE 110 with the location session between MME 130 and E-SMLC 140 for UE 110. Such association may not require MME 130 to retain state information associated with the LPP messages transferred to UE 110, e.g., MME 130 may not need to store information associated specifically with steps 1 and 2 in FIG. 3. This may simplify the design and implementation of MME 130. The routing ID may also allow UE 110 to associate LCS-related messages received from MME 130 with an MO-LR that is known to UE 110, which may avoid privacy issues. The use of the routing ID may be beneficial for both MO-LR and MT-LR and may allow LCS-related messages to be explicitly associated with a previous MO-LR request from UE 110 or an MT-LR privacy interaction by UE 110.

In one design, for an MO-LR, UE 110 may assign an ID (e.g., ID X) for the MO-LR and may include ID X in an MO-LR Request message sent to MME 130 to originate the MO-LR. The MO-LR Request message may request the location of UE 110 or may request assistance data to allow UE 110 to subsequently obtain its own location. The MO-LR Request message may be part of an LCS NAS protocol (e.g., may employ the same PD value, or a different PD value, to the PD value used to transport LPP messages). MME 130 may then invoke a location session with E-SMLC 140 to obtain the location of UE 110. If E-SMLC 140 later sends LCS-related messages (e.g., LPP messages) to UE 110 to obtain location information (e.g., to obtain satellite measurements), then MME 130 may include ID X in each NAS message carrying an LCS-related message for UE 110. In general, MME 130 may include ID X in any subsequent NAS message sent to transfer LCS-related messages to UE 110. UE 110 would then know that the LCS-related messages are for the MO-LR originated by UE 110 because of ID X sent with the LCS-related messages. UE 110 (and the user) can know that transactions associated with the LCS-related messages have already been authorized. The use of ID X assigned by UE 110 for the MO-LR may thus provide some level of security and may mitigate privacy issue.

ID X selected by UE 110 for the MO-LR may not be unique within MME 130. A unique ID may be ensured for UE 110 in various manners. In one design, ID X may be selected by UE 110 based on a set of rules to ensure uniqueness and may then be used as the routing ID. In another design, ID X selected by UE 110 may be combined with another ID assigned by MME 130 to ensure uniqueness, and the combination of the two IDs may be used as the routing ID. When a routing ID is obtained by combining ID X assigned by UE 110 with an ID assigned by MME 130, the method of combination should be reversible and known to UE 110, so that UE 110 can obtain ID X from the routing ID in any received NAS message. For all designs, UE 110 may be informed so that it can identify the routing ID assigned to the UE.

In one design, for an MT-LR, MME 130 may assign a routing ID (e.g., ID Y) for the MT-LR and may include ID Y in a privacy notification message sent to UE 110 to notify the user of the MT-LR and to provide information to UE 110 or the LCS client who originated the MT-LR (e.g., the name and network address of LCS client 160). The privacy notification message may also request UE 110 for authorization of the MT-LR. This privacy notification message may also be referred to as a notification and verification request and may be part of the LCS NAS protocol (e.g., may use the same PD value, or a different PD value, to the PD value used in a NAS message to transport LPP messages). If the user authorizes the request or if authorization is not needed, then MME 130 may invoke a location session with E-SMLC 140 to obtain the location of UE 110 for the MT-LR, or may allow an existing location session with E-SMLC 140 to continue to completion. E-SMLC 140 may thereafter send LCS-related messages (e.g., LPP messages) to UE 110 to determine the UE location (e.g., to obtain satellite measurements). MME 130 may include ID Y in each NAS message carrying an LCS-related message for UE 110. UE 110 would then know that the LCS-related message is supporting the MT-LR and is associated with the prior privacy notification due to ID Y sent with the LCS-related message. UE 110 (and the user) can know that the transaction associated with the LCS-related message has already been authorized (or will later be authorized). The use of ID Y assigned by MME 130 for the MT-LR may thus provide some level of security and may mitigate privacy issue.

MO-LR messages may be exchanged between MME 130 and UE 110 in order to allow UE 110 to request its own location, request for assistance data, or request transfer of its location to third party LCS client 160. Privacy-related messages may be exchanged between MME 130 and UE 110 in order to notify a user of an MT-LR location request from external LCS client 160 and to enable the user to optionally accept or reject the request. LPP messages may be exchanged between MME 130 and UE 110 to support location services and positioning for UE 110 via E-SMLC 140. LCS-related messages such as MO-LR messages, MT-LR messages, and LPP messages may be efficiently transported via NAS messages.

As shown in FIG. 3, NAS messages may conveniently be used to transport LCS-related messages between UE 110 and eNB 120 and between eNB 120 and MME 130. The use of NAS messages to transport LCS-related messages may avoid impact to eNB 120, which may not need to be aware of the content of the NAS messages. Furthermore, the use of NAS messages to transport LCS-related messages may simplify implementation and operation of all affected entities.

NAS messages carrying LCS-related messages may be differentiated from NAS messages carrying other messages for other functions (e.g., ESM messages and EMM messages) in various manners. In one design, the PD may be used to identify NAS messages transporting LCS-related messages. A NAS message may include various fields, one of which is a 4-bit PD field. A PD value of 0010 (binary) is assigned to ESM messages, and a PD value of 0111 (binary) is assigned to EMM messages. A PD value that is not yet assigned to any messages (or is assigned but never used) may be assigned to LCS-related messages. For example, a PD value of 1101 (binary) is not yet assigned and may be used for LCS-related messages. Alternatively, a PD value of 1100 (binary), which was assigned in 3GPP Release 98 to support GERAN Type A Location Measurement Units (LMUs) but has never been deployed, may be re-assigned to LCS-related messages. Other PD values may also be used for LCS-related messages, e.g., an extended PD value obtained by using PD value 1110 plus some additional value in an extension.

Figure 4:
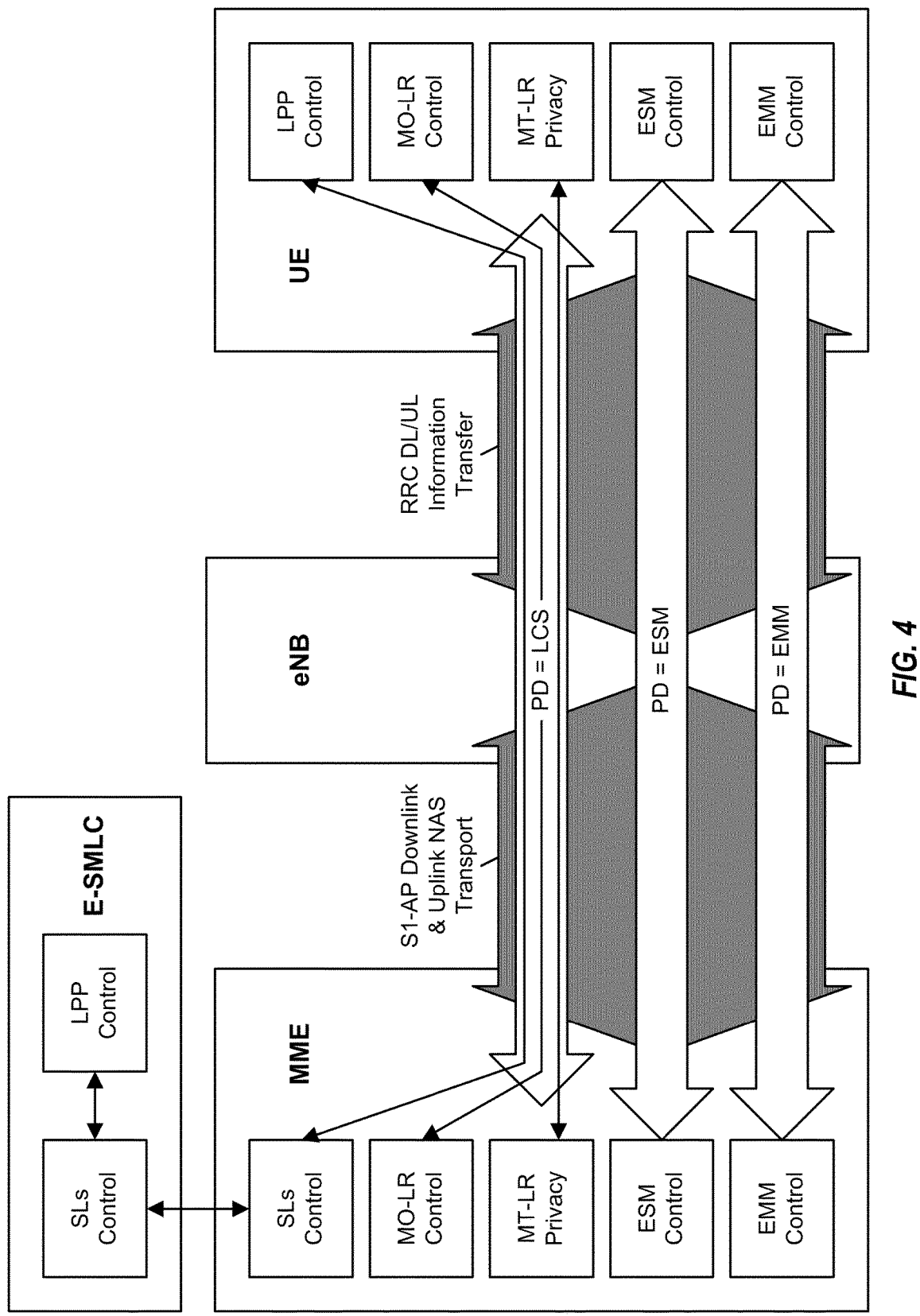
FIG. 4 shows use of NAS messages to transport messages for different functions.

FIG. 4 shows a design of using NAS messages to transport messages for different functions with different PD values. NAS messages carrying ESM messages may include the PD value of 0010 assigned to ESM messages. NAS messages carrying EMM messages may include the PD value of 0111 assigned to EMM messages. NAS messages carrying LCS-related messages may include the PD value assigned to LCS-related messages. UE 110 may be able to differentiate between ESM messages, EMM messages, and LCS-related messages based on their different assigned PD values and may forward these messages to the appropriate modules at UE 110. Similarly, MME 130 may be able to differentiate between ESM messages, EMM messages, and LCS-related messages based on their different assigned PD values and may forward these messages to the appropriate modules at MME 130. Demultiplexing of ESM messages, EMM messages, and LCS-related messages may thus be performed based on the PD values.

In one design, LCS-related messages for different functions (or different types of LCS-related messages) may be assigned the same PD value and may be demultiplexed based on a designated field (e.g., an LCS message type field) in the LCS-related messages or the NAS messages. This may allow LCS-related messages for MT-LR, LCS-related messages for MO-LR, and LCS-related messages for LPP to be forwarded to appropriate modules at UE 110 and also at MME 130.

In another design, different types of LCS-related messages may be assigned different PD values and may be demultiplexed based on the PD values. For example, one PD value may be assigned for MO-LR messages and MT-LR messages, and another PD value may be assigned for LPP messages. This design may allow UE 110 and MME 130 to more easily distinguish LPP messages from MT-LR and MO-LR messages at the NAS transport level. This design may also be more efficient when separate logical modules in UE 110 and MME 130 are used to support LPP messages versus MO-LR and MT-LR messages Referring back to FIG. 2, in one design, an LCS NAS protocol may be used between UE 110 and MME 130 and may support transport of LCS-related messages between UE 110 and MME 130. The LCS NAS protocol may support MO-LR messages, MT-LR messages, LPP messages, etc. The LCS NAS protocol may be assigned a unique PD value. LCS-related messages for the LCS NAS protocol may be transported in NAS messages, which may include the PD value assigned to the LCS NAS protocol, as described above for FIG. 4. The LCS NAS protocol may provide a mechanism to demultiplex the MO-LR messages, MT-LR messages, LPP messages, etc. In another design, the LCS NAS protocol may be omitted, and LCS-related messages may be transported in NAS messages and may be identified by a new PD value or some other mechanism. For both designs, each NAS message may include a routing ID that may be associated with the location session between MME 130 and E-SMLC 140 to allow MME 130 to properly route the LCS-related message(s) transported in the NAS message.

FIG. 5 shows a design of a process 500 for exchanging NAS messages for location services. Process 500 may be performed by a UE (as described below) or by some other entity. The UE may communicate with a RAN via LTE access (512). The UE may exchange at least one NAS message with an MME to transport at least one message for location services for the UE (514). In one design, each NAS message may comprise a routing ID associated with a location session maintained by the MME for the UE.

In one design, each NAS message may comprise a PD field that may be set to a designated value to identify the NAS message transporting one or more messages for location services for the UE. In another design, each NAS message transporting one or more messages for location services may be identified in some other manners.

In one design, the at least one message for location services may comprise at least one LPP message, or at least one message for an MO-LR, or at least one message for an MT-LR. For example, the at least one message for location services may comprise a privacy notification message used to notify the user about the MT-LR and to optionally allow the user to permit or deny the request.

FIG. 6 shows a design of a process 600 for exchanging NAS messages for location services. Process 600 may be performed by an MME (as described below) or by some other entity. The MME may identify a UE communicating with a RAN via LTE access (block 612). The MME may exchange at least one NAS message with the UE to transport at least one message for location services for the UE (block 614).

The MME may communicate with an E-SMLC for a location session to provide location services for the UE. The MME may assign a routing ID for communication between the MME and the UE that is related to the location session between the MME and the E-SMLC. Each NAS message exchanged between the MME and the UE may comprise the routing ID to associate the NAS message with the location session between the MME and the E-SMLC.

In one design, the at least one message for location services may comprise at least one LPP message, or at least one message for an MO-LR, or at least one message for an MT-LR. In one design, each NAS message may include a PD field that may be set to a designated value to identify the NAS message transporting one or more messages for location services for the UE. In another design, each NAS message transporting one or more messages for location services may be identified in some other manners.

Figure 7:
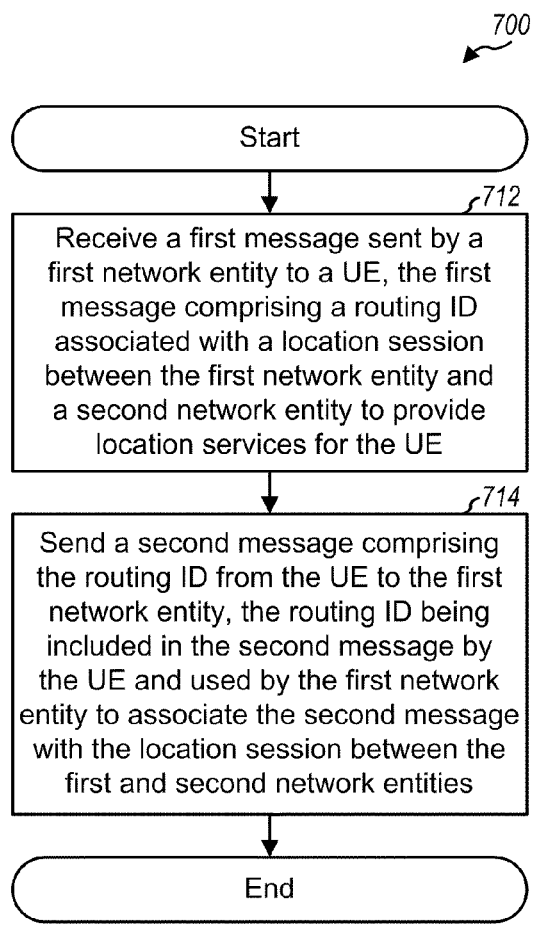
FIGS. 7 and 8 show processes performed by the UE and the MME, respectively, for exchanging messages for location services using a routing ID.

FIG. 7 shows a design of a process 700 for exchanging messages for location services. Process 700 may be performed by a UE (as described below) or by some other entity. The UE may receive a first message sent by a first network entity (e.g., an MME) to the UE, e.g., in steps 2 and 3 in FIG. 3 (block 712). The first message may comprise a routing ID associated with a location session between the first network entity and a second network entity (e.g., an E-SMLC) to provide location services for the UE. The UE may send a second message comprising the routing ID to the first network entity, e.g., in steps 5 and 6 in FIG. 3 (block 714). The routing ID may be included in the second message by the UE and may be used by the first network entity to associate the second message with the location session between the first and second network entities.

The routing ID may be determined by the first network entity and/or the UE. In one design, the UE may send an MO-LR request message comprising a first ID to the first network entity. The routing ID may be determined based on the first ID, e.g., may be equal to the first ID or may include the first ID. In another design, the UE may receive a privacy notification message for an MT-LR from the first network entity. The privacy notification message may comprise the routing ID assigned by the first network entity.

In one design, the first and second messages may comprise NAS messages transporting at least one message for location services for the UE. The first message and/or the second message may comprise at least one LPP message, or at least one message for an MO-LR, or at least one message for an MT-LR, etc.

Figure 8:
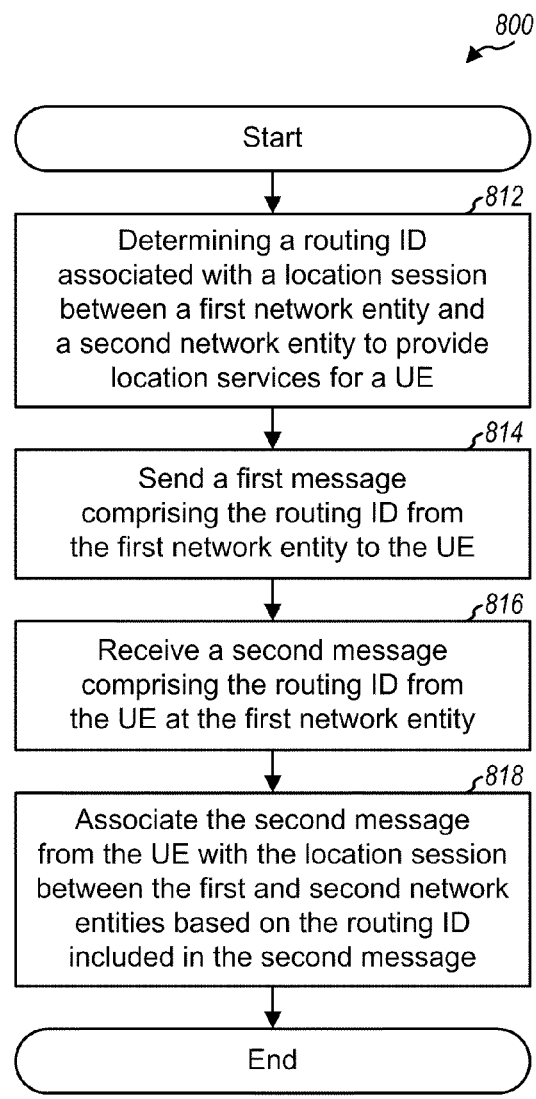

FIG. 8 shows a design of a process 800 for exchanging messages for location services. Process 800 may be performed by a first network entity (e.g., an MME). The first network entity may determine a routing ID associated with a location session between the first network entity and a second network entity (e.g., an E-SMLC) to provide location services for a UE (block 812). The first network entity may send a first message comprising the routing ID to the UE, e.g., in steps 2 and 3 in FIG. 3 (block 814). The first network entity may receive a second message comprising the routing ID from the UE, e.g., in steps 5 and 6 in FIG. 3 (block 816). The first network entity may associate the second message from the UE with the location session between the first and second network entities based on the routing ID included in the second message (block 818).

In one design of block 812, the first network entity may assign the routing ID. In another design, the first network entity may receive a first ID for an MO-LR from the UE and may assign the routing ID based on the first ID. For example, the routing ID may be equal to the first ID or may include the first ID as part of the routing ID.

In one design, the first network entity may send a message for an MO-LR or an MT-LR as the first message. For example, the first network entity may send a privacy notification message for the MT-LR as the first message.

In one design, the first network entity may receive a third message sent by the second network entity for the location session, e.g., in step 1 in FIG. 3. The first network entity may send the first message to the UE in response to receiving the third message from the second network entity. In one design, the first network entity may send a fourth message to the second network entity for the location session (e.g., in step 7 in FIG. 3) in response to receiving the second message from the UE. The third and fourth messages may include either the routing ID or another ID associated with the location session.

In one design, the first and second messages may comprise NAS messages transporting at least one message for location services for the UE. In one design, the first message may comprise at least one LPP message, which may be sent by the second network entity via the third message. In one design, the second message may comprise at least one LPP message, which may be forwarded to the second network entity via the fourth message. The first, second, third and fourth messages may also include other messages related to location services for the UE.

Figure 9:
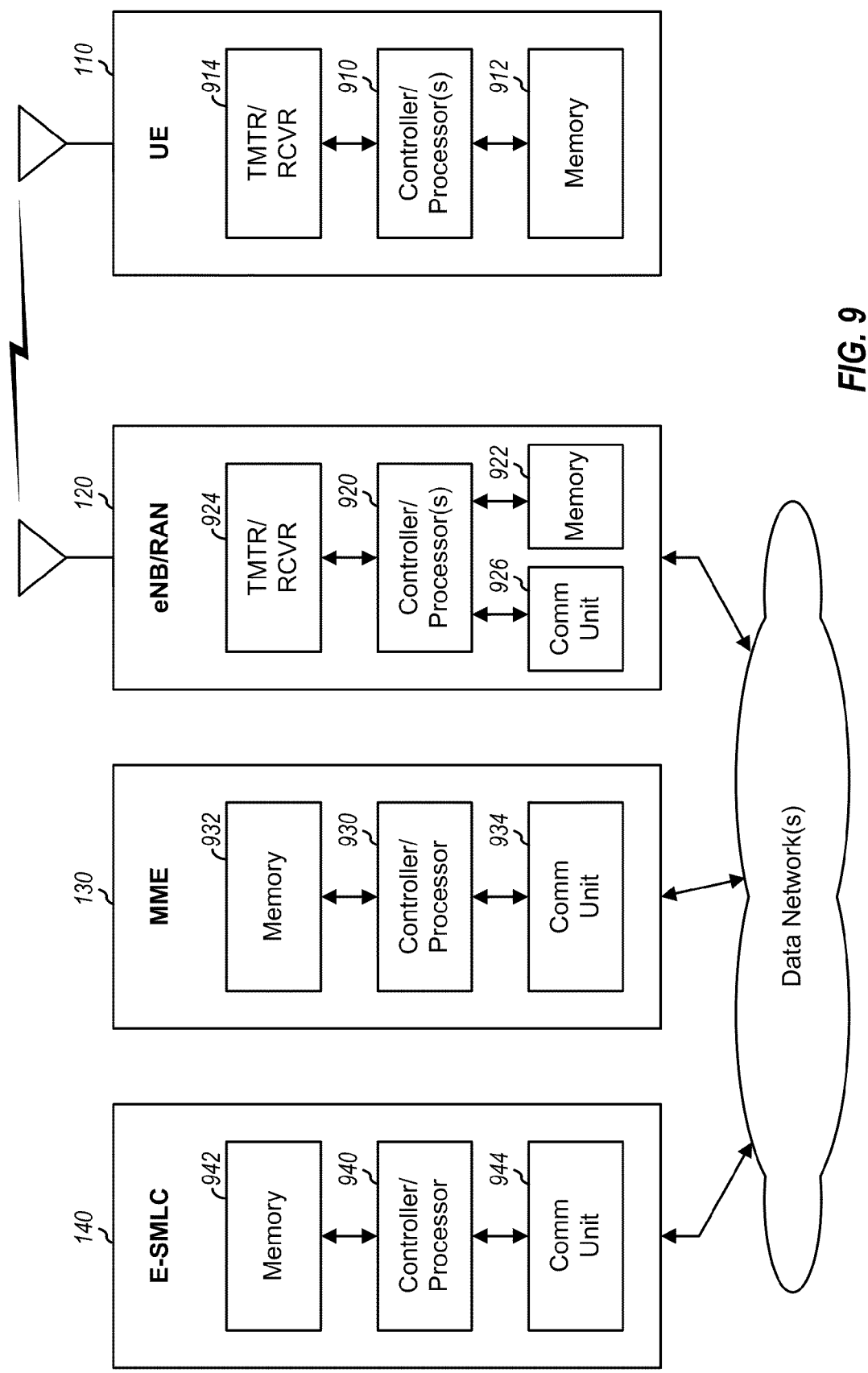
FIG. 9 shows a block diagram of various entities in FIG. 1.

FIG. 9 shows a block diagram of a design of UE 110, base station/eNB 120, MME 130, and E-SMLC 140 in FIG. 1. For simplicity, FIG. 9 shows (i) one or more controller/processors 910, memory 912, and transmitter/receiver (TMTR/RCVR) 914 for UE 110, (ii) controller/processor(s) 920, memory 922, transmitter/receiver 924, and communication (Comm) unit 926 for eNB 120, (iii) controller/processor(s) 930, memory 932, and communication unit 934 for MME 130, and (iv) controller/processor(s) 940, memory 942, and communication unit 944 for E-SMLC 140. In general, each entity may include any number of processing units (e.g., controllers, processors), memories, transceivers, communication units, etc.

On the downlink, eNB 120 may transmit traffic data, messages/signaling, and pilot to UEs within its coverage area. These various types of data may be processed by processor(s) 920 and conditioned by transmitter 924 to generate a downlink signal, which may be transmitted to the UEs. Processor(s) 920 may perform processing for eNB/RAN 120 for the call flow in FIG. 3. At UE 110, the downlink signals from eNB 120 may be received and conditioned by receiver 914, and processed by processor(s) 910 to obtain various types of information for location services, and/or other services. Processor(s) 910 may decode messages used for the call flow in FIG. 3. Processor(s) 910 may also perform or direct process 500 in FIG. 5, process 700 in FIG. 7, and/or other processes for the techniques described herein. Memories 912 and 922 may store program codes and data for UE 110 and eNB 120, respectively.

On the uplink, UE 110 may transmit traffic data, messages/signaling, and pilot to eNB 120. These various types of data may be processed by processor(s) 910 and conditioned by transmitter 914 to generate an uplink signal, which may be transmitted to eNB 120. At eNB 120, the uplink signals from UE 110 and other UEs may be received and conditioned by receiver 924 and further processed by processor(s) 920 to obtain various types of information, e.g., data, messages/signaling, etc. Processor(s) 920 may perform processing for eNB/RAN 120 for the call flow in FIG. 3. eNB 120 may communicate with other network entities (e.g., in one or more data networks) via communication unit 926.

Within MME 130, processor(s) 930 may perform processing to support location services, memory 932 may store program codes and data for MME 130, and communication unit 934 may allow MME 130 to communicate with other entities. Processor(s) 930 may perform processing for MME 130 for the call flow in FIG. 3. Processor(s) 930 may also perform or direct process 600 in FIG. 6, process 800 in FIG. 8, and/or other processes for the techniques described herein.

Within E-SMLC 140, processor(s) 940 may perform processing to support location services for UEs, memory 942 may store program codes and data for E-SMLC 140, and communication unit 944 may allow E-SMLC 140 to communicate with other entities. Processor(s) 940 may perform processing for E-SMLC 140 for the call flow in FIG. 3.

Those of skill in the art would understand that information and signals may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN. The techniques may also be implemented in conjunction with femtocells.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a user equipment (UE) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "user equipment" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "user equipment" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered a "user equipment."

The methodologies described herein may be implemented by various means depending upon the application. For example, these methodologies may be implemented in hardware, firmware, software, or any combination thereof. For an implementation involving hardware, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable medium may take the form of a computer program product. Computer-readable medium includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of obtaining location services, comprising:
communicating with a Radio Access Network (RAN) via Long Term Evolution (LTE) access by a User Equipment (UE);
receiving a first Non-Access Stratum (NAS) message from a Mobility Management Entity (MME) to transport a first message for location services for the UE; and
sending a second NAS message to the MME to transport a second message for location services for the UE, wherein each of the first NAS message and the second NAS message comprises a routing identifier (ID) for associating the first NAS message, the second NAS message, the first message for location services, and the second message for location services with a location session between the MME and a location center to provide the location services, wherein the routing ID is a correlation ID that identifies the location session, and wherein the routing ID is maintained by the MME for the UE.

2. The method of claim 1, wherein the first message for location services and the second message for location services each comprises an LTE Positioning Protocol (LPP) message, a message for a Mobile Originated Location Request (MO-LR), a message for a Mobile Terminated Location Request (MT-LR), or a message for a Network Induced Location Request (NI-LR).

3. The method of claim 1, wherein the first NAS message and the second NAS message each comprises a protocol discriminator (PD) field that is set to a designated value to indicate that the first NAS message or the second NAS message is transporting one or more messages for location services for the UE.

4. An apparatus for obtaining location services, the apparatus comprising:
means for communicating with a Radio Access Network (RAN) via Long Term Evolution (LTE) access by the apparatus;
means for receiving a first Non-Access Stratum (NAS) message from a Mobility Management Entity (MME) to transport a first message for location services for the apparatus; and
means for sending a second NAS message to the MME to transport a second message for location for the apparatus, wherein each of the first NAS message and the second NAS message comprises a routing identifier (ID) for associating the first NAS message, the second NAS message, the first message for location services, and the second message for location services with a location session between the MME and a location center to provide the location services, wherein the routing ID is a correlation ID that identifies the location session, and wherein the routing ID is maintained by the MME for the apparatus.

5. The apparatus of claim 4, wherein the first message for location services and the second message for location services each comprises an LTE Positioning Protocol (LPP) message, a message for a Mobile Originated Location Request (MO-LR), a message for a Mobile Terminated Location Request (MT-LR), or a message for a Network Induced Location Request (NI-LR).

6. An apparatus for obtaining location services, comprising:
at least one processing unit configured to communicate with a Radio Access Network (RAN) via Long Term Evolution (LTE) access by the apparatus and to receive a first Non-Access Stratum (NAS) message from a Mobility Management Entity (MME) to transport a first message for location services for the apparatus and send a second NAS message to the MME to transport a second message for location services for the UE, wherein each of the first NAS message and the second NAS message comprises a routing identifier (ID) for associating the first NAS message, the second NAS message, the first message for location services, and the second message for location services with a location session between the MME and a location center to provide the location services, wherein the routing ID is a correlation ID that identifies the location session, and wherein the routing ID is maintained by the MME for the apparatus.

7. The apparatus of claim 6, wherein the first message for location services and the second message for location services each comprises an LTE Positioning Protocol (LPP) message, a message for a Mobile Originated Location Request (MO-LR), a message for a Mobile Terminated Location Request (MT-LR), or a message for a Network Induced Location Request (NI-LR).

8. A non-transitory computer-readable medium comprising:
code to cause at least one computer to communicate with a Radio Access Network (RAN) via Long Term Evolution (LTE) access by a User Equipment (UE),
code to cause the at least one computer to receive a first Non-Access Stratum (NAS) message from a Mobility Management Entity (MME) to transport a first message for location services for the UE; and
code to cause the at least one computer to send a second NAS message to the MME to transport a second message for location services for the UE, wherein each of the first NAS message and the second NAS message comprises a routing identifier (ID) for associating the first NAS message, the second NAS message, the first message for location services, and the second message for location services with a location session between the MME and a location center to provide the location services, wherein the routing ID is a correlation ID that identifies the location session, and wherein the routing ID is maintained by the MME for the UE.

9. A method of supporting location services, comprising:
identifying a User Equipment (UE) communicating with a Radio Access Network (RAN) via Long Term Evolution (LTE) access;
sending a first Non-Access Stratum (NAS) message to the UE to transport a first message for location services for the UE; and
receiving a second NAS message from the UE to transport a second message for location services for the UE, wherein each of the first NAS message and the second NAS message comprises a corresponding routing identifier (ID) for associating the first NAS message, the second NAS message, the first message for location services, and the second message for location services with a location session between the MME and a location center to provide the location services, wherein the routing ID is a correlation ID that identifies the location session, and wherein the corresponding routing ID is maintained by the MME for the UE.

10. The method of claim 9, wherein the first message for location services and the second message for location services each comprises an LTE Positioning Protocol (LPP) message, a message for a Mobile Originated Location Request (MO-LR), a message for a Mobile Terminated Location Request (MT-LR), or a message for a Network Induced Location Request (NI-LR).

11. The method of claim 9, wherein the first NAS message and the second NAS message each comprises a protocol discriminator (PD) field that is set to a designated value to indicate that the first NAS message or the second NAS message is transporting one or more messages for location services for the UE.

12. The method of claim 9, further comprising:
communicating with an Evolved Serving Mobile Location Center (E-SMLC) for a location session between the MME and the E-SMLC to provide location services for the UE; and
assigning the corresponding routing identifier (ID), wherein the corresponding routing ID is further related to the location session between the MME and the E-SMLC, and wherein the corresponding routing ID further associates its corresponding NAS message with the location session between the MME and the E-SMLC.

13. An apparatus for supporting location services, comprising:
means for identifying a User Equipment (UE) communicating with a Radio Access Network (RAN) via Long Term Evolution (LTE) access;
means for sending a first Non-Access Stratum (NAS) message to the UE to transport a first message for location services for the UE; and
means for receiving a second NAS message from the UE to transport a second message for location services for the UE, wherein each of the first NAS message and the second NAS message comprises a corresponding routing identifier (ID) for associating the first NAS message, the second NAS message, the first message for location services, and the second message for location services with a location session between the apparatus and a location center to provide the location services, wherein the routing ID is a correlation ID that identifies the location session, and wherein the corresponding routing ID is maintained by the apparatus for the UE.

14. The apparatus of claim 13, wherein the first message for location services and the second message for location services each comprises an LTE Positioning Protocol (LPP) message, a message for a Mobile Originated Location Request (MO-LR), a message for a Mobile Terminated Location Request (MT-LR), or a message for a Network Induced Location Request (NI-LR).

15. The apparatus of claim 13, further comprising:
means for communicating with an Evolved Serving Mobile Location Center (E-SMLC) for a location session between the MME and the E-SMLC to provide location services for the UE; and
means for assigning the corresponding routing identifier (ID), wherein the corresponding routing ID is further related to the location session between the MME and the E-SMLC, and wherein the corresponding routing ID further associates each NAS message with the location session between the MME and the E-SMLC.

16. A method of obtaining location services, comprising:
receiving a first Non-Access Stratum (NAS) message sent by a first network entity to a User Equipment (UE), the first NAS message comprising a routing identifier (ID) for associating the first NAS message with a location session between the first network entity and a second network entity to provide location services for the UE; and
sending a second NAS message comprising the routing ID from the UE to the first network entity, the routing ID being included in the second NAS message by the UE and used by the first network entity to associate the second NAS message with the location session between the first and second network entities,
wherein the routing ID is a correlation ID that identifies the location session and associates each of the first NAS message and the second NAS message with the location session.

17. The method of claim 16, further comprising:
sending a Mobile Originated Location Request (MO-LR) request message comprising a first ID from the UE to the first network entity, wherein the routing ID is determined based on the first ID.

18. The method of claim 16, further comprising:
receiving a privacy notification message for a Mobile Terminated Location Request (MT-LR) from the first network entity, wherein the privacy notification message comprises the routing ID.

19. The method of claim 16, wherein the first network entity comprises a Mobility Management Entity (MME) and the second network entity comprises an Evolved Serving Mobile Location Center (E-SMLC).

20. An apparatus for obtaining location services, comprising:
means for receiving a first Non-Access Stratum (NAS) message sent by a first network entity to a User Equipment (UE), the first NAS comprising a routing identifier (ID) for associating the first NAS message with a location session between the first network entity and a second network entity to provide location services for the UE; and
means for sending a second NAS message comprising the routing ID from the UE to the first network entity, the routing ID being included in the second NAS message by the UE and used by the first network entity to associate the second NAS message with the location session between the first and second network entities,
wherein the routing ID is a correlation ID that identifies the location session and associates each of the first NAS message and the second NAS message with the location session.

21. The apparatus of claim 20, further comprising:
means for sending a Mobile Originated Location Request (MO-LR) request message comprising a first ID from the UE to the first network entity, wherein the routing ID is determined based on the first ID.

22. The apparatus of claim 20, further comprising:
means for receiving a privacy notification message for a Mobile Terminated Location Request (MT-LR) from the first network entity, wherein the privacy notification message comprises the routing ID.

23. A method of supporting location services, comprising:
determining a routing identifier (ID) associated with a location session between a first network entity and a second network entity to provide location services for a User Equipment (UE);
sending a first Non-Access Stratum (NAS) message comprising the routing ID from the first network entity to the UE;
receiving a second NAS message comprising the routing ID from the UE at the first network entity; and associating the second NAS message from the UE with the location session between the first and second network entities based on the routing ID included in the second message, wherein the routing ID is a correlation ID that identifies the location session.

24. The method of claim 23, wherein the determining the routing ID comprises assigning the routing ID by the first network entity.

25. The method of claim 23, wherein the determining the routing ID comprises receiving a first ID for a Mobile Originated Location Request (MO-LR) from the UE, and assigning the routing ID by the first network entity based on the first ID.

26. The method of claim 23, further comprising:
sending a privacy notification message comprising the routing ID for a Mobile Terminated Location Request (MT-LR) to the UE.

27. The method of claim 23, further comprising:
receiving a third message sent by the second network entity to the first network entity for the location session, wherein the first NAS message is sent in response to receiving the third message; and
sending a fourth message from the first network entity to the second network entity for the location session, wherein the fourth message is sent in response to receiving the second NAS message.

28. The method of claim 27, wherein the third and fourth messages exchanged between the first and second network entities include either the routing ID or another ID associated with the location session.

29. The method of claim 23, wherein the first network entity comprises a Mobility Management Entity (MME) and the second network entity comprises an Evolved Serving Mobile Location Center (E-SMLC).

30. An apparatus for supporting location services, comprising:

means for determining a routing identifier (ID) associated with a location session between the apparatus and a network entity to provide location services for a User Equipment (UE);
means for sending a first Non-Access Stratum (NAS) message comprising the routing ID from the apparatus to the UE;
means for receiving a second NAS message comprising the routing ID from the UE at the apparatus; and
means for associating the second NAS message from the UE with the location session between the apparatus and the network entity, the associating being done based on the routing ID included in the second message,
wherein the routing ID is a correlation ID that identifies the location session.

31. The apparatus of claim 30, wherein the means for determining the routing ID comprises means for assigning the routing ID by the apparatus.

32. The apparatus of claim 30, wherein the means for determining the routing ID comprises:
means for receiving a first ID for a Mobile Originated Location Request (MO-LR) from the UE, and
means for assigning the routing ID by the apparatus based on the first ID.

33. The apparatus of claim 30, further comprising:
means for sending a privacy notification message comprising the routing ID for a Mobile Terminated Location Request (MT-LR) to the UE.

34. The apparatus of claim 30, further comprising:
means for receiving a third message sent by the network entity to the apparatus for the location session, wherein the first NAS message is sent in response to receiving the third message; and
means for sending a fourth message from the apparatus to the network entity for the location session, wherein the fourth message is sent in response to receiving the second NAS message.

* * * * *